US 9,324,463 B2

(12) United States Patent
Soda et al.

(10) Patent No.: US 9,324,463 B2
(45) Date of Patent: Apr. 26, 2016

(54) PREVENTIVE MAINTENANCE METHOD AND APPARATUS FOR A STRUCTURAL COMPONENTS IN A REACTOR PRESSURE VESSEL

(71) Applicant: Hitachi-GE Nuclear Energy, Ltd, Hitachi-shi, Ibaraki (JP)

(72) Inventors: Takashi Soda, Hitachi (JP); Akihiro Kanno, Hitachi (JP); Nobuo Murakami, Hitachi (JP); Fujio Yoshikubo, Mito (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 467 days.

(21) Appl. No.: 13/753,766

(22) Filed: Jan. 30, 2013

(65) Prior Publication Data

US 2013/0195236 A1 Aug. 1, 2013

(30) Foreign Application Priority Data

Jan. 31, 2012 (JP) .................................. 2012-017615

(51) Int. Cl.
| | |
|---|---|
| G21C 17/00 | (2006.01) |
| G21C 17/003 | (2006.01) |
| C21D 7/06 | (2006.01) |
| C21D 9/08 | (2006.01) |
| G21C 21/00 | (2006.01) |

(52) U.S. Cl.
CPC ............... *G21C 17/003* (2013.01); *C21D 7/06* (2013.01); *C21D 9/08* (2013.01); *G21C 21/00* (2013.01)

(58) Field of Classification Search
CPC .................. G21Y 2002/101; G21Y 2002/102; G21Y 2002/103; G21Y 2004/20; G21Y 2004/502

USPC .......................................... 376/249, 277, 283
See application file for complete search history.

(56) References Cited

U.S. PATENT DOCUMENTS

| | | | | |
|---|---|---|---|---|
| 5,305,361 A | * | 4/1994 | Enomoto et al. | ............... 376/316 |
| 2009/0166338 A1 | * | 7/2009 | Sato | .............................. 219/76.1 |

FOREIGN PATENT DOCUMENTS

| | | |
|---|---|---|
| JP | 2002-200528 A | 7/2002 |
| JP | 2008-14447 A | 1/2008 |
| JP | 2010-276491 A | 12/2010 |
| JP | 4840443 B2 | 12/2011 |

OTHER PUBLICATIONS

Japanese Office Action dated Oct. 27, 2014 with partial English-language translation (Three (3) pages).

* cited by examiner

*Primary Examiner* — Marshall O'Connor
(74) *Attorney, Agent, or Firm* — Crowell & Moring LLP

(57) ABSTRACT

Disclosed is a water jet peening method that includes the steps of: preparing a water jet peening apparatus having a supporting member, a first divider plate, a nozzle support body, and a second divider plate; inserting the water jet peening apparatus into a piping in which a structure or electronic device is mounted that is susceptible to damage by a jet of water discharged from a jet nozzle or by shock waves; disposing either the first divider plate or the second divider plate between the jet nozzle and the structure or electronic device; filling water into an internal area formed in the piping between the first divider plate and the second divider plate; and subjecting the inner surface of the piping to water jet peening by allowing the jet nozzle to discharge a jet of water into the water in the internal area.

7 Claims, 2 Drawing Sheets

PREVENTIVE MAINTENANCE METHOD AND APPARATUS FOR A STRUCTURAL COMPONENTS IN A REACTOR PRESSURE VESSEL

BACKGROUND OF THE INVENTION

1. Field of the Invention

The present invention relates to a method and apparatus for water jet peening, and more particularly to a method and apparatus for water jet peening that is preferably applicable to a nuclear power plant.

2. Description of the Related Art

It is known that a residual stress mitigation method is available to give compressive residual stress to the surface of a structural member of a nuclear power plant or the like by subjecting such a structural member by applying water jet peening.

A water jet peening method described in JP-2010-276491-A subjects the outer surface of a bottom mounted instrument piping to water jet peening by disposing a jet nozzle, which discharges a jet of high-pressure water, at the bottom of a reactor pressure vessel and rotating the jet nozzle, which is discharging a jet of high-pressure water, around the bottom mounted instrument piping. In this manner, compressive residual stress is given to the outer surface of the bottom mounted instrument piping.

A water jet peening method for giving compressive residual stress to the inner surface of piping is described in JP-2008-14447-A. This water jet peening method inserts a working device in piping with a jet nozzle into a piping, moves the working device within the piping, and allows the jet nozzle to discharge a jet of high-pressure water toward the inner surface of a welding area of the piping. Hence, compressive residual stress is given to the inner surface of the welding area.

A water jet peening method to be applied in a piping is described in JP-2002-200528-A. In order to subject the inner surface of a welding area formed inner side of a piping to water jet peening, a jet nozzle is inserted into the piping from one end of the piping, and the one end of the piping is sealed with a tube plug while the other end of the piping is sealed with a tube plug or with a valve. Water is then filled into a sealed area in the piping. Eventually, the inner surface of the welding area formed on the piping is subjected to water jet peening by allowing the jet nozzle in the water to discharge a jet of high-pressure water. When the jet of high-pressure water is discharged, air existing in the sealed area is expelled outside through a pipe connected to the tube plug.

SUMMARY OF THE INVENTION

The method described in JP-2002-200528-A forms a water area in the piping targeted for water jet peening and subjects the inner surface of the piping in contact with the water area to water jet peening. However, no tube plug is inserted into the piping in this method. Therefore, it is difficult to subject an arbitrary area in the piping to water jet peening. Further, the water jet peening method described in JP-2002-200528-A is not designed to prevent damage to a structure or electronic device that may exist in the piping and become damaged by shock waves formed by high-pressure water or cavitations.

The present invention has been made in view of the above-described circumstances to provide a water jet peening method and apparatus for making it possible to prevent damage to a structure or electronic device that is mounted on a piping and is susceptible to damage by a jet of water or by shock waves.

According to one aspect of the present invention, there is provided a water jet peening method including the steps of: preparing a water jet peening apparatus having a supporting member, a first divider plate mounted on one end of the supporting member, a nozzle support body formed by disposing a jet nozzle around the supporting member, and a second divider plate mounted on the supporting member, the jet nozzle being disposed between the first divider plate and the second divider plate; inserting the water jet peening apparatus into a piping in which a structure or electronic device that is susceptible to damage by shock waves is mounted; disposing either the first divider plate or the second divider plate between the jet nozzle and the structure or electronic device; filling water into an internal area formed in the piping between the first divider plate and the second divider plate; and subjecting the inner surface of the piping to water jet peening by allowing the jet nozzle to discharge a jet of water into the water in the internal area.

Either the first divider plate or the second divider plate is disposed between the jet nozzle and the structure or electronic device that is mounted on the piping that is susceptible to damage by shock waves. Water is filled into the internal area formed in the piping between the first divider plate and the second divider plate. The inner surface of the piping is subjected to water jet peening by allowing the jet nozzle to discharge a jet of water. Consequently, the water jet peening is performed for the inner surface of the piping by shock waves that are generated upon the collapse of cavitations in the jet of water discharged from the jet nozzle into the water existing in the internal area. Further, the jet of water discharged or the shock waves are blocked by the divider plate disposed between the jet nozzle and the structure or electronic device. This makes it possible to prevent the structure or electronic device from being damaged by the jet of water discharged or by the shock waves.

According to the present invention, a structure or electronic device that is mounted on a piping and is susceptible to damage by a jet of discharged water or by shock waves can be prevented from being damaged when the inside of the piping is subjected to water jet peening.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
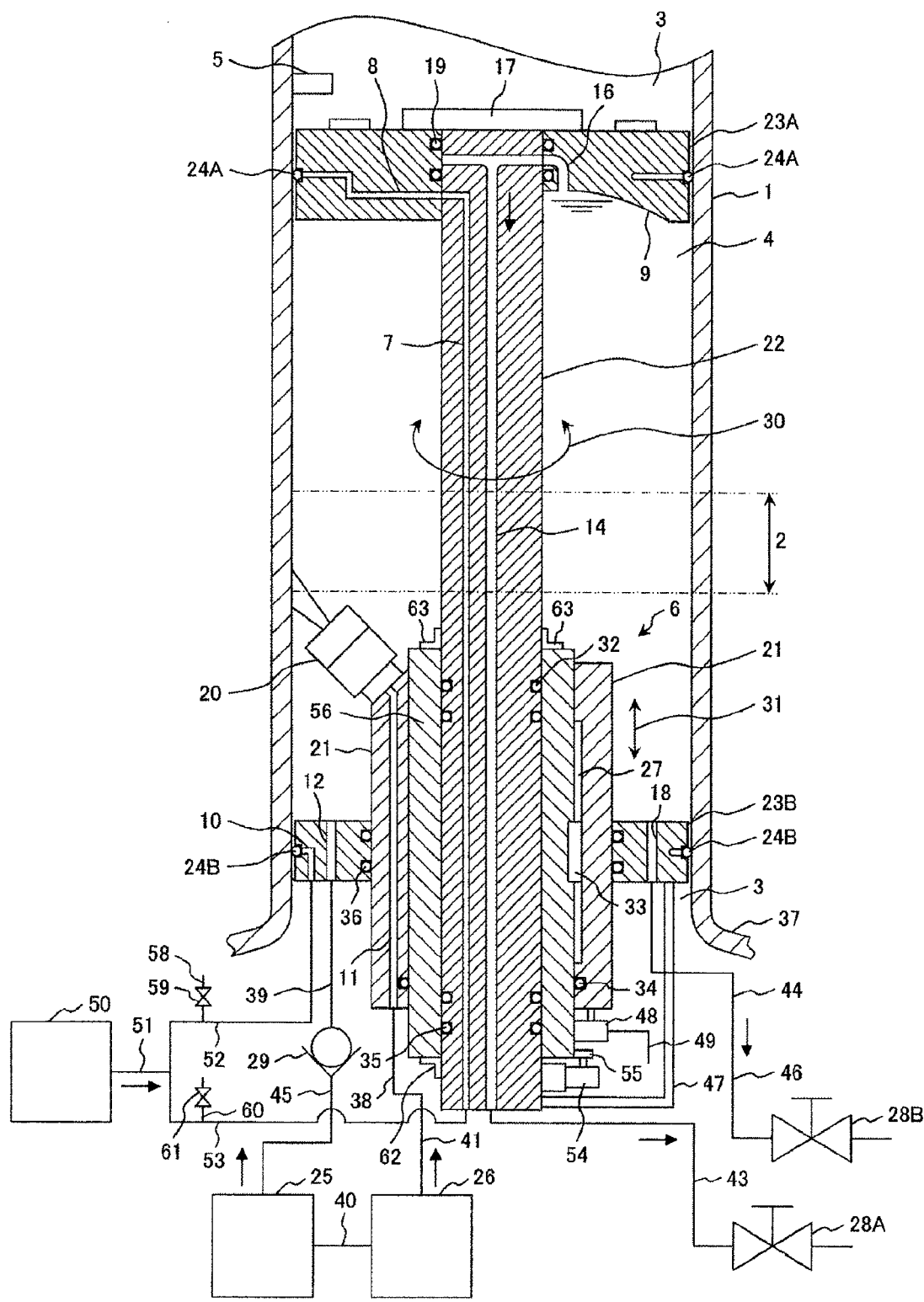
FIG. 1 is a diagram illustrating a water jet peening method that is applied inside of a piping in accordance with a first embodiment of the present invention.

Embodiments of the present invention will now be described.

First Embodiment

A water jet peening method according to a first embodiment of the present invention will be described below with reference to FIG. 1.

First of all, a water jet peening apparatus to which the water jet peening method according to the present embodiment is applied will be described. The water jet peening apparatus 6 includes a jet nozzle 20, a nozzle head 21, a supporting member 22 shaped like a round bar, divider plates 23A, 23B, a high-pressure water supply device 38, water supply device 39, a water discharge device 44, a sealing device 51, and a rotation body 56.

The supporting member 22 is surrounded by the ring-shaped divider plate 23A. A coupling member 17 couples the divider plate 23A to one end of the supporting member 22. A gap between the divider plate 23A and the supporting member 22 is sealed with a seal member 19 attached to the inner circumference of the divider plate 23A. The supporting member 22 is penetrated through a cylindrical rotation body 56. The inner surface of the rotation body 56 is in contact with the outer surface of the supporting member 22. The rotation body 56 can rotate along the outer surface of the supporting member 22. A gap between the supporting member 22 and the cylindrical rotation body 56 is sealed with seal members 32, 35 attached to the supporting member 22. The rotation body 56 is surrounded by the cylindrical nozzle head 21. The inner surface of the nozzle head 21 is in contact with the outer surface of the rotation body 56. A groove 27 extending in the axial direction of the supporting member 22 is formed in the inner surface of the nozzle head 21. A key 33 mounted on the outer surface of the rotation body 56 is inserted into the groove 27. The length of the groove 27 in the axial direction of the supporting member 22 is longer than the length of the key 33 in the axial direction. Hence, the nozzle head 21 can move in the axial direction of the supporting member 22 along the rotation body 56. A gap between the rotation body 56 and the nozzle head 21 is sealed with a seal member 34 attached to the nozzle head 21. The nozzle head 21 is surrounded by the ring-shaped divider plate 23B. The inner surface of the divider plate 23B is in contact with the outer surface of the nozzle head 21. A gap between the nozzle head 21 and the divider plate 23B is sealed with a seal member 36 attached to the divider plate 23B. The jet nozzle 20 is mounted on a leading end of the nozzle head 21 and inclined with respect to the shaft center of the supporting member 22. A plurality of combining members 47 attached to the outer surface of the supporting member 22 are used to fasten the divider plate 23B to an end of the supporting member 22, which is opposite the end of the supporting member 22 on which the divider plate 23A is mounted. The combining members 47 are spaced at predetermined intervals and disposed in the circumferential direction of the supporting member 22.

A stopper structure 62, which comes into contact with one end face of the rotation body 56, is attached to the outer surface of the supporting member 22. A stopper structure 63, which comes into contact with the other end face of the rotation body 56, is attached to the outer surface of the supporting member 22. The stopper structures 62, 63 are not mounted on the rotation body 56.

The divider plate 23A forms a scoop (air gathering area) 9 on its surface facing the divider plate 23B. An air emission route 16, which is open in the scoop 9, is formed in the divider plate 23B. An air emission route 14 is formed in the supporting member 22 and extended from one end of the supporting member 22, on which the divider plate 23A is mounted, to the other end of the supporting member 22. The air emission route 14 is connected to the air emission route 16. An air emission hose 43 having a pressure adjustment valve 28A is connected to the air emission route 14.

A high-pressure water route 11 is connected to the jet nozzle 20 is formed in the nozzle head 21. The high-pressure water supply device 38 includes a high-pressure pump 26, a water supply pipe 40, and a high-pressure hose 41. The water supply pipe 40, which is connected to a water source 25, is connected to the high-pressure pump 26. The high-pressure hose 41, which is connected to the high-pressure water route 11, is connected to the high-pressure pump 26.

The water supply device 39 includes a check valve 29 and a water supply pipe 45. The water supply pipe 45, which is provided with the check valve 29, is connected to a water supply route 12, which is formed through the divider plate 23B. The water supply pipe 45 is connected to the water source 25 and provided with a pump (not shown). The water discharge device 44 includes a pressure adjustment valve 28B and a water discharge pipe 46. The water discharge pipe 46, which has the pressure adjustment valve 28B, is connected to a water discharge route 18, which is formed through the divider plate 23B.

The sealing device 51 includes ring-shaped hollow seal members 24A, 24B made of rubber or other elastic material, a compressor 50, and air supply pipes 52, 53. A ring-shaped internal space is formed in the hollow seal members 24A, 24B. The hollow seal member 24A is attached to the outer circumference of the divider plate 23A to surround the divider plate 23A. An air supply route 8 connected to the internal space of the hollow seal member 24A is formed in the divider plate 23A and extended to the inner surface of the divider plate 23A. The air supply route 8 is connected to an air supply route 7 formed in the supporting member 22. The air supply route 7 is connected to the air supply pipe 53, which is mounted on an end of the supporting member 22. The hollow seal member 24B is mounted on the outer circumference of the divider plate 23B to surround the divider plate 23B. An air supply route 10 connected to the internal space of the hollow seal member 24B is formed in the divider plate 23B and extended to the inner surface of the divider plate 23B. The air supply route 10 is in communication with the air supply pipe 52, which is mounted on a lateral surface of the divider plate 23B. The air supply pipes 52, 53 are connected to the compressor 50. An exhaust pipe 58 provided with an on-off valve 59 is connected to the air supply pipe 52. An exhaust pipe 60 provided with an on-off valve 61 is connected to the air supply pipe 53.

A motor 54 is disposed at an end of the supporting member 22 that is opposite the other end of the supporting member 22 to which the divider plate 23A is attached, and mounted on the outer surface of the supporting member 22. A gear 55 is coupled to the rotation shaft of the motor 54 through a down speed mechanism (not shown). The gear 55 is in mesh with a gear (not shown) disposed on the outer surface of one end of the rotation body 56. The rotation body 56 is surrounded by the gear disposed on the outer surface of the rotation body 56. The rotation body 56, the motor 54, and the gear 55 form a rotation device for rotating the nozzle head 21.

A transfer device 48 is mounted on the outer surface of one end of the rotation body 56. Although not shown, the transfer device 48 includes a cylinder barrel, a piston disposed in the cylinder barrel, and a piston rod coupled to the piston. The piston rod is coupled to one end of the nozzle head 21. An air supply hose 49 connected to the compressor 50 is connected to the cylinder barrel of the transfer device 48.

A water jet peening method according to the present embodiment, which is exercised by using the water jet peening apparatus 6, will now be described in detail.

A target to be subjected to water jet peening is, for example, a piping 1 connected to a vessel 37. More specifically, the inner surface of a welding area of the piping 1 is subjected to water jet peening. The piping 1 is extended in a vertical direction. There is a gaseous atmosphere in the vessel 37 and in the piping 1. When the supporting member 22 is pressed into the piping 1, the water jet peening apparatus 6 is inserted into the piping 1 from the inside of the vessel 37. In this instance, the divider plates 23A, 23B attached to the supporting member 22 are inserted into the piping 1. As no pressurized air is introduced into the internal spaces of the hollow seal members 24A, 24B, the hollow seal members 24A, 24B are easily deformed and positioned apart from the inner surface of the piping 1. Therefore, the divider plates 23A, 23B can be easily inserted into the piping 1 and moved within the piping 1. When the leading divider plate 23A travels through a residual stress improvement area 2, which is on the inner surface of the piping 1, until the residual stress improvement area 2 is positioned between the divider plate 23A and the divider plate 23B, the water jet peening apparatus 6 stops its travel in the piping 1.

The on-off valves 59, 61 are closed. The compressor 50 is driven so that resulting compressed air is discharged from the compressor 50 to the air supply pipes 52, 53. The compressed air discharged to the air supply pipe 52 is supplied to the internal space of the hollow seal member 24B through the air supply route 10. The supplied compressed air causes the hollow seal member 24B to expand so that the outer surface of the hollow seal member 24B comes into contact with the inner surface of the piping 1 involving the entire circumferential surface of the divider plate 23B. A gap between the inner surface of the piping 1 and the outer surface of the divider plate 23B is sealed with the expanded hollow seal member 24B. The compressed air discharged to the air supply pipe 53 is supplied to the internal space of the hollow seal member 24A through the air supply routes 7, 8. The supplied compressed air causes the hollow seal member 24A to expand so that the outer surface of the hollow seal member 24A comes into contact with the inner surface of the piping 1 involving the entire circumferential surface of the divider plate 23A. A gap between the inner surface of the piping 1 and the outer surface of the divider plate 23A is sealed with the expanded hollow seal member 24A.

Consequently, an external area 3, which exists outside the divider plates 23A, 23B, and an internal area 4, which is isolated from external area 3, are formed in the piping 1 between the divider plate 23A and the divider plate 23B. The residual stress improvement area 2 of the piping 1 faces the internal area 4. The jet nozzle 20 mounted on the nozzle head 21 is located in the internal area 4.

The pressure adjustment valve 28B is closed, whereas the pressure adjustment valve 28A is open. A pump (not shown) disposed in the water supply pipe 45 is driven so that the water in the water source 25 is pressurized, passed through the water supply pipe 45 with the check valve 29 and through the water supply route 12, and supplied into the internal area 4. Air existing in the internal area 4 is pushed upward by the water supplied into the internal area 4, passed through the air emission route 16 and through the air emission route 14, forwarded to the air emission hose 43, and discharged outside. As the water is continuously supplied from the water source 25 to the internal area 4, the level of the water in the internal area 4 rises so that the internal area 4 is filled with the water before long. In this state, the pump disposed in the water supply pipe 45 stops to shut off the water supply to the internal area 4.

The preparation for water jet peening for the inner surface of the piping 1 is now completed.

The high-pressure pump 26 is driven to, pressurize the water in the water source 25 and discharge the resulting high-pressure water. The high-pressure water discharged from the high-pressure pump 26 is passed through the high-pressure hose 41 and through the high-pressure water route 11 and supplied to the jet nozzle 20. The high-pressure water is then discharged in the form of a jet of high-pressure water from the jet nozzle 20 toward the residual stress improvement area 2, which exists on the inner surface of the piping 1. Cavitations included in the discharged jet of water collapse to generate shock waves. The generated shock waves are applied to the residual stress improvement area 2. The shock waves generate compressive residual stress by improving tensile residual stress, which exists in the residual stress improvement area 2.

While discharging a jet of high-pressure water, the jet nozzle 20 rotates in a circumferential direction along the inner surface of the piping 1. The aforementioned rotation device rotates the jet nozzle 20. When the jet nozzle 20 is to be rotated, the motor 54 is driven to transmit the rotation of the motor 54 to the gear 55, which then rotates the rotation body 56. As the key 33 mounted on the rotation body 56 is inserted into the groove 27 formed in the inner surface of the nozzle head 21, the key 33 transmits the rotation of the rotation body 56 to the nozzle head 21. This causes the nozzle head 21 to rotate around the supporting member 22 together with the rotation body 56. Hence, while discharging a jet of water, the jet nozzle 20 attached to the nozzle head 21 rotates in the circumferential direction of the piping 1 to perform water jet peening in the circumferential direction of the residual stress improvement area 2. The transfer device 48 attached to the outer surface of the rotation body 56 rotates together with the nozzle head 21. After the jet nozzle 20 makes one revolution around the supporting member 22, a control device (not shown) exercises control to rotate the motor 54 in opposite direction. As the control device causes the motor 54 to repeatedly rotate in normal direction and in opposite direction, the jet nozzle 20 rotates around the supporting member 22 alternately in normal direction and opposite direction as indicated by an arrow 30. This prevents the high-pressure hose 41 connected to the rotating nozzle head 21 and the air supply hose 49 connected to the transfer device 48 from being wrung off.

While the shock waves are applied to the inner surface of the piping 1 in the residual stress improvement area 2 after a jet of water is discharged from the jet nozzle 20, the cavitations that are discharged, included in the jet of water, and left uncollapsed are raised through the water in the internal area 4 and gathered by the scoop 9 formed on the divider plate 23A. The gathered cavitations are then discharged from the scoop 9 to the air emission route 16. Further, the cavitations are discharged to the air emission hose 43 through the air emission route 14. This makes it possible to prevent the internal area 4 from being filled with the cavitations.

While the jet of water is being discharged from the jet nozzle 20, the pressure adjustment valve 28B is open so that the water in the internal area 4 is discharged to the water discharge pipe 46 through the water discharge route 18. The degree of opening of the pressure adjustment valve 28B is adjusted so that the water discharged from the jet nozzle 20 to the internal area 4 entirely flows to the water discharge pipe 46 through the water discharge route 18. As the water in the internal area 4 is discharged outside the internal area 4 through the water discharge route 18, it is possible to prevent the pressure in the internal area 4 from being excessively increased by the jet of water discharged from the jet nozzle 20.

Compressed air discharged from the compressor 50 is supplied to a lower chamber (not shown) in the cylinder barrel of the transfer device 48 through the air supply hose 49. The piston in the cylinder barrel is then pushed upward so that the nozzle head 21, which is coupled to the piston by way of the piston rod, moves upward in the axial direction of the supporting member 22 (see an arrow 31). The nozzle head 21 moves in the axial direction because the key 33 mounted on the rotation body 56 is inserted into the groove 27 longer than the key 33 to let the nozzle head 21 move along the key 33. Therefore, the jet nozzle 20, which is discharging a jet of water, can be moved upward without allowing the divider plates 23A, 23B to move in the axial direction of the piping 1 while the jet nozzle 20 is rotating around the supporting member 22 within the internal area 4. As the jet nozzle 20 rotates within the internal area 4 and moves in the axial direction of the supporting member 22, the residual stress improvement area 2 in the circumferential direction and axial direction of the piping 1 can be entirely subjected to water jet peening.

To move the divider plates 23A, 23B in the axial direction of the piping 1 within the piping 1 to reposition the jet nozzle 20, it is necessary to discharge the water in the internal area 4 to the outside through the water discharge route 18 and expel the compressed air from the hollow seal members 24A, 24B as described later to contract the hollow seal members 24A, 24B. Further, after the supporting member 22, the divider plates 23A, 23B, and the like are moved in the axial direction within the piping 1 to reposition the jet nozzle 20, it is necessary to introduce compressed air into the hollow seal members 24A, 24B and fill the internal area 4 with water. Thus, it takes a long period of time to reposition the jet nozzle in the axial direction of the piping 1 by moving the divider plates 23A, 23B. In the present embodiment, however, the nozzle head 21 can move in the axial direction of the supporting member 22 as described earlier. Therefore, the jet nozzle 20 can move in the axial direction of the piping 1 within a short period of time.

After completion of water jet peening for the inner surface of the piping 1, the on-off valves 59, 61 open. The compressed air in the hollow seal member 24A is then discharged outside through the air supply routes 8, 7, the air supply pipe 53, and the exhaust pipe 60. Further, the compressed air in the hollow seal member 24B is discharged outside through the air supply route 10, the air supply pipe 52, and the exhaust pipe 58. The hollow seal members 24A, 24B contract and leave the inner surface of the piping 1. Subsequently, the water jet peening apparatus 6 is extracted from the piping 1 and removed outside the vessel 37.

According to the present embodiment, the sizes of the divider plates 23A, 23B, which define the internal area 4, are smaller than the transverse cross sectional area of the inner surface of the piping 1 to be subjected to water jet peening. Therefore, the water jet peening apparatus 6 can be easily inserted into the piping 1 and subjected to water jet peening at an arbitrary position within the piping 1. Particularly, as the contractible, circular, hollow seal members 24A, 24B are disposed on the outer surfaces of the divider plates 23A, 23B, the water jet peening apparatus 6 can be easily inserted into and extracted from the piping 1.

When compressed air is introduced into the internal spaces of the hollow seal members 24A, 24B to expand the hollow seal members 24A, 24B while the water jet peening apparatus 6 is inserted in the piping 1, it is possible to seal the gap between the inner surface of the piping 1 and the divider plate 23A and the gap between the inner surface of the piping 1 and the divider plate 23B. Thus, the internal area 4 can be isolated from the external area 3. This makes it possible to fill the internal area 4 with water and subject the residual stress improvement area 2 to water jet peening.

The jet nozzle, 20 is disposed between the divider plate 23A and the divider plate 23B. Therefore, even when a sensor or other electronic device 5 (or structure) that may be damaged by shock waves generated upon the collapse of cavitations included in a jet of water discharged from the jet nozzle 20 is disposed in the piping 1, the divider plate 23A can be positioned between the electronic device 5 and the jet nozzle 20. Thus, the shock waves generated in the internal area 4 during water jet peening can be blocked by the divider plate 23A to prevent the shock waves from being applied to the electronic device 5. In the present embodiment, the jet nozzle 20 is disposed between the divider plate 23A and the divider plate 23B. This makes it possible to prevent the electronic device 5 mounted on the piping 1 from being damaged by the shock waves.

FIG. 1 shows that the electronic device 5 is protruded inward from the inner surface of the piping 1. However, when the electronic device 5 is mounted on the piping so that a leading end of the electronic device 5 is positioned on the inner surface of the piping 1 without allowing the electronic device 5 to protrude inward from the inner surface of the piping 1, the water jet peening apparatus 6 can be inserted into the piping 1 to the extent that the water jet peening apparatus 6 is positioned behind the electronic device 5. When the inner surface of the piping 1 is to be subjected to water jet peening at a place behind the electronic device 5, the divider plate 23B is disposed between the jet nozzle 20 and the electronic device 5. When water jet peening is performed in this state, the divider plate 23B blocks the shock waves and prevents the electronic device 5 from being damaged by the shock waves. Even when the electronic device 5 is mounted on the piping 1 while it is filled with water, it is possible to prevent the electronic device 5 from being damaged as far as the divider plates 23A, 23B are disposed between the jet nozzle 20 and the electronic device 5.

In the present embodiment, the stopper structures 62, 63 prevent the rotation body 56 from moving in the axial direction of the supporting member 22. Therefore, even when the transfer device 48 moves the nozzle head 21 in that axial direction, the rotation body 56 does not move in that axial direction. Further, the stopper structure 62 prevents the rotation body 56 from falling.

As the nozzle head 21 is surrounded by the divider plate 23B, it is easy to connect the high-pressure hose 41 to the high-pressure water route 11, which is formed in the rotating nozzle head 21, and connect the air supply hose 49 to the transfer device 48, which rotates together with the rotation body 56. The nozzle head 21 and the transfer device 48 can also be rotated. Further, as the nozzle head 21 is surrounded by the divider plate 23B, the spacing interval between the divider plate 23A and the divider plate 23B can be narrowed to ease the handling of the water jet peening apparatus 6 and improve the installability of the water jet peening apparatus 6 in the piping 1.

Second Embodiment

Figure 2:
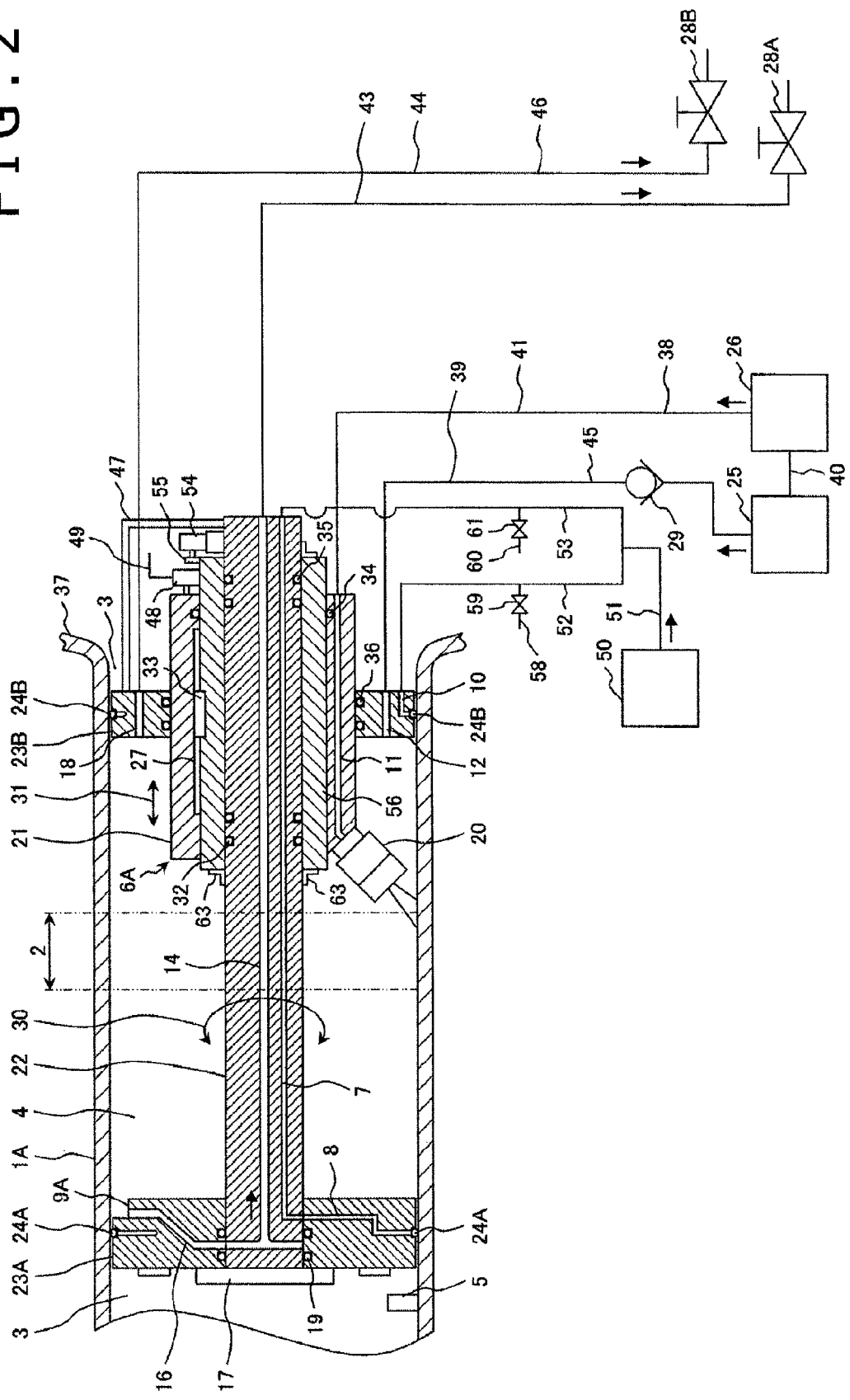
FIG. 2 is a diagram illustrating the water jet peening method that is applied inside of the piping in accordance with a second embodiment of the present invention.

The water jet peening method according to a second embodiment of the present invention will now be described with reference to FIG. 2.

In the first embodiment, water jet peening is performed for the inner surface of the piping 1 that is vertically extended. In the second embodiment, however, water jet peening is performed for the inner surface of a piping 1A that is horizontally extended.

A water jet peening apparatus 6A to which the water jet peening method according to the second embodiment is applied is configured so that the scoop (air gathering area) 9 included in the water jet peening apparatus 6 to which the water jet peening method according to the first embodiment is applied is replaced by a scoop 9A. The other components of the water jet peening apparatus 6A are the same as those of the water jet peening apparatus 6.

The scoop (air gathering area) 9A is formed on a circumferential surface of the divider plate 23A in the water jet peening apparatus 6A that faces the divider plate 23B. When the water jet peening apparatus 6A is to be inserted into the piping 1A that is horizontally extended and connected to the vessel 37, the scoop 9A is located at the highest position in the piping 1A as shown in FIG. 2.

The water jet peening performed by the water jet peening apparatus 6A with respect to the residual stress improvement area 2, which is the inner surface of the piping 1A, is the same as the water jet peening performed by the water jet peening apparatus 6 according to the first embodiment.

The second embodiment provides the same advantages as the first embodiment.

What is claimed is:

1. A water jet peening method comprising the steps of:
    preparing a water jet peening apparatus having a supporting member, a first divider plate mounted on one end of the supporting member, a nozzle support body formed by disposing a jet nozzle around the supporting member, and a second divider plate mounted on the supporting member, the jet nozzle being disposed between the first divider plate and the second divider plate;
    inserting the water jet peening apparatus into a piping in which a structure or electronic device is mounted that is susceptible to damage by a jet of water discharged from the jet nozzle or by shock waves;
    disposing either the first divider plate or the second divider plate between the jet nozzle and the structure or electronic device;
    filling water into an internal area formed in the piping between the first divider plate and the second divider plate;
    subjecting the inner surface of the piping to water jet peening by allowing the jet nozzle to discharge a jet of water into the water in the internal area;
    discharging uncollapsed cavitations outside the internal area through a scoop formed in the first divider plate, on its surface facing the second divider plate and connected to an air emission route formed in the supporting member, the uncollapsed cavitations being included in the jet of water discharged from the jet nozzle into the water; and
    discharging the water in the internal area through the water discharge route formed in the second divider plate, wherein
    the uncollapsed cavitations and the water in the internal area are discharged simultaneously.

2. The water jet peening method according to claim 1, further comprising the steps of:
    before filling the water into the internal area, expanding a first hollow seal member and a second hollow seal member by supplying air to the internal space of the first hollow seal member and of the second hollow seal member, the first hollow seal member being disposed on the outer circumference of the first divider plate to surround the first divider plate, the second hollow seal member being disposed on the outer circumference of the second divider plate to surround the second divider plate;
    sealing a gap between the inner surface of the piping and the first divider plate with the expanded first hollow seal member; and
    sealing a gap between the inner surface of the piping and the second divider plate with the expanded second hollow seal member.

3. The water jet peening method according to claim 1, further comprising the step of rotating the jet nozzle, which is discharging a jet of water, around the supporting member and moving the jet nozzle in the axial direction of the supporting member.

4. The water jet peening method according to claim 3, further comprising the step of:
    before filling the water into the internal area, expanding a first hollow seal member and a second hollow seal member by supplying air to the internal space of the first hollow seal member and of the second hollow seal member, the first hollow seal member being disposed on the outer circumference of the first divider plate to surround the first divider plate, the second hollow seal member being disposed on the outer circumference of the second divider plate to surround the second divider plate;
    sealing a gap between the inner surface of the piping and the first divider plate with the expanded first hollow seal member; and
    sealing a gap between the inner surface of the piping and the second divider plate with the expanded second hollow seal member.

5. The water jet peening method according to claim 1, further comprising the step of:
    before filling the water into the internal area, expanding a first hollow seal member and a second hollow seal member by supplying air to the internal space of the first hollow seal member and of the second hollow seal member, the first hollow seal member being disposed on the outer circumference of the first divider plate to surround the first divider plate, the second hollow seal member being disposed on the outer circumference of the second divider plate to surround the second divider plate;
    sealing a gap between the inner surface of the piping and the first divider plate with the expanded first hollow seal member; and
    sealing a gap between the inner surface of the piping and the second divider plate with the expanded second hollow seal member.

6. The water jet peening method according to claim 1, further comprising the step of rotating the jet nozzle, which is discharging a jet of water, around the supporting member and moving the jet nozzle in the axial direction of the supporting member.

7. The water jet peening method according to claim 5, further comprising the step of rotating the jet nozzle, which is discharging a jet of water, around the supporting member and moving the jet nozzle in the axial direction of the supporting member.

* * * * *